Patented Oct. 20, 1931

1,828,028

UNITED STATES PATENT OFFICE

ELTON R. DARLING, OF DANVILLE, ILLINOIS, ASSIGNOR TO PACIFIC LUMBER COMPANY, OF CHICAGO, ILLINOIS, A CORPORATION OF MAINE

PRODUCTION OF SHEATHING BOARDS FROM REDWOOD BARK

No Drawing.    Application filed June 19, 1929. Serial No. 372,224.

The present invention relates to a process for the conversion of the bark of the redwood tree, otherwise known as the Sequoia, and which grows in great abundance in the Western part of the United States and Canada.

One of the objects of the invention is to utilize the bark of these trees which hitherto has been stripped from them in the forests where the trees grow and are felled, and has not been utilized for any useful purpose.

A further object of the invention is to treat the said bark after its removal from the trees in such manner as to separate the same into its various constituents and to produce from some of them a compact and light-weight artificial board suitable for sheathing purposes, wall board and the like.

A further object of the invention is to produce a sheathing board of artificial lumber which will be proof against the inroads of rodents, termites, ants and other wood-attacking and disintegrating insets and animals.

This process comprises the treatment of the bark from redwood trees. These trees, which grow to enormous heights, are the largest trees in the world, and have bark that averages from 8 to 27 inches in thickness. The bark is almost incombustible and contains a material apparently very repulsive to insects, so that in the forests where these trees grow there is no bird life, because there are no insects upon which the birds may feed.

This property of redwood bark is taken advantage of in the process for producing a sheathing board or lumber which will be proof against the inroad of rodents, termites, and ants and other wood-destroying insects. In this respect the material is unique. It is also inherently fire-resistant and is said to burn only with considerable difficulty and not to be a free supporter of combustion, so that board made therefrom does not represent the same fire hazard as does board made from bagasse fibres. While not burning with a free flame, it appears that the material, when once ignited, shows a distinct tendency to smoulder, acting in this respect very much like punk.

Formerly it was the custom to fell the trees in the woods and to bark them at that point, and eventually after the bark had dried out sufficiently, to burn it up with branches and other woods waste. This, however, was quite a task and the recent perfection of lumbering operations enables the transportation of felled trees with their bark about them directly to the lumber mill. At this point the trees are de-barked by mechanical means.

As an exemplification of the manner in which the process is to be carried out, it may be stated that after the felled logs arrive at the lumber mill they are mechanically de-barked so as to separate the bark from the wood of the trees. This bark is then run through the regular standard hogging mill which converts it into comparatively small individual chips which are then passed through a shedding device which may also be of standard manufacture, in order to produce a comparatively loose shredded product. This shredded material is then immersed in water in which it is allowed to soak for about eight hours, whereby the thereincontained soluble matter and particularly tannic acid is leached therefrom.

The leach water is separated from the defibered bark and contains tannic acid to the extent of from 4 to 5% of the weight of the bark treated. The tannic acid may be recovered from this leached water by evaporating the same to syrupy consistency. However, in order to economize water and evaporator expenses, it is desirable to utilize leaching water a number of times on the counter-current basis, so as to build up a concentration of tannic acid therein and finally to give the shredded bark a leaching in clear water so as to remove as far as possible the tannic acid therefrom, as this forms a valuable byproduct and thereby aids in the reduction of the cost of operation. The fresh water used for the last leaching is used for the leaching of fresh bark according to the well-known methods of washing in counter-current battery formation.

Irrespective of the precise method of leaching employed the leached fibre is thereupon subjected to digestion under pressure, in a solution of caustic soda of approximately 1% strength. The pressure in the digesters, which are made of iron and are steam-tight, may vary from 30 to 70 pounds superatmospheric and the operation requires about 2½ hours, this varying somewhat with the condition of the bark and the degree to which the same has been defibered prior to the digestion step.

After the digestion is complete the bark and the alkali liquid is discharged from the digesters and run over any convenient filtering device such for example as a rotary Oliver filter which separates the treated fibres from the liquid, forming a matted cake on the filter, which is washed while still thereon by a spray of water, preferably hot. The treated bark after stripping from the filters is then put into a grinder, together with hot water, where it is subjected to a vigorous grinding or beating operation in order to still further disintegrate the fibres. This defibering apparatus is on the order of what has come to be known in the trade as a Schultz-O'Neil grinder, which discharges into a large tank where the fiber is kept in suspension in water by means of agitation so as to form to a substantially uniform suspension of the fiber in the water.

As the bark of the redwood trees contains in addition to the fibrous material a peculiar black substance consisting of discrete rounded particles, the nature of which is not known but which, for lack of a better name, I have at present designated as "tree-sand", and as the said "tree-sand" is undesirable in the finished board, as it readily sifts therefrom, it is advisable to separate the fiber from this sand. This is accomplished best at the stage of the proceeding just described above wherein the fiber is in suspension in the water and this is accomplished by passing the suspension through a riffle tank which consists of a number of partitions which cause the suspension to pass under and over the partitions, whereby the fiber, being much lighter than the "tree-sand" is carried along, while the "tree-sand" settles to the bottom from whence it is periodically removed through sluice gates.

After traversing the riffles the suspension is dewatered preferably on a standard Oliver board-former, an Oliver filter or other suitable filtration means. It is not desired at this point to produce an actual board, but merely a very thick sludge of dewatered material which is then transferred to a paper machine or beater where it is subjected to agitation and treatment with alum and a resin soap in order to size the material, much in the same fashion as paper stock is sized in the manufacture of paper. The object of this sizing operation is to render the material naturally adherent when subsequently passed over an Oliver board-former upon which sufficient of the material is deposited to supply the amount needed to produce a board, whereupon the material is strongly compressed to remove as much water as possible after which the newly formed, still wet board is cut to size and placed aside for drying and seasoning.

The boards thus produced after drying are of a pleasing reddish brown color, light in weight and very porous. As a result of this structure they are excellent heat insulators and also absorb sound very readily and thereby serve to deaden reverberation when employed in the lining of halls and large rooms. They are particularly suited for sheathing houses and similar structures, being nailed directly to the studding, and then covered either by cement, stucco or by building paper and a veneer of brick. As already stated, the Sequoia bark is almost incombustible and certainly is not a supporter of free flame, so that the board, even without additional fireproofing materials, is quite resistant to the transmission of fire. As the bark also is displeasing to insects and rodents, it is not subject to attack thereby and thus is particularly desirable for the construction of buildings in such parts of the world where wood-destroying insects, such as termites, exist. As the board is made entirely from which has hitherto been an absolute waste material, and as this material is available in almost unbelievably great quantities, the cost of production is extremely low, while the product, being endowed with superior qualities, commands a good market price and therefore renders the herein disclosed process of great commercial utility.

As a substitute for the alum and resin other suitable sizing materials may, of course, be employed. For the digestion other alkalies such as sodium carbonate and lime may be employed. It is also to be construed as withing the scope of the invention to leave the "tree-sand" in the board, provided that the sizing is heavy enough to prevent this "tree-sand" from sifting out subsequently. The addition of fireproofing agents such ammonium phosphate and similar materials are to be considered as within the scope of the present invention. It is also possible to blend with the redwood fiber other plant fibers suitable for the formation of the sheathing board and I do not wish to be limited in any way as to the use of such additional fiber, but desire that my invention be construed in accordance with the hereto appended claims as related to the prior art.

The defibered and treated redwood bark when it is in condition ready to be formed into a board may, however, be merely dried and sold in loose form in bags or other suitable containers forming in that condition a most excellent filler for plastic materials. It is possible by suitable bleaching means to decolorize the fiber to yield an almost white product which consists of individual sharply crinkled, mechanically strong fibers which form an excellent substitute for cotton flock and similar fillers for plastics.

What I claim as my invention is:

1. The process of converting redwood bark into useful products which comprises roughly shredding the bark, leaching the same with water to remove tannins therefrom, treating the leached bark with a dilute alkaline solution under heat and pressure, washing the bark free from alkali, comminuting the same in the presence of water and passing the resultant suspension through riffle tanks to remove "tree-sand" therefrom, beating the fibers further in water and then separating the same therefrom and drying them.

2. The process as claimed in claim 1 wherein the alkaline solution consists of a solution of sodium hydroxide.

3. The process as claimed in claim 1 wherein the alkaline solution consists of a 1% solution of sodium hydroxide and the heating takes place at a pressure of from 30 to 70 lbs. per square inch.

4. The process of manufacturing sheathing boards from redwood bark fibers which comprises roughly shredding redwood bark, leaching the same in water to remove tannins therefrom, treating the leached bark with a dilute alkaline solution under heat and pressure to disintegrate the same, separating the thus liberated bark fibers from the alkaline liquor, passing the fibers through riffle tanks while suspended in water to remove "treesand" therefrom, partially removing water from said suspension, beating the thickened suspension in a beater with the addition of a suitable sizing material, and thereupon forming a board therefrom and drying and seasoning the latter.

5. The process as in claim 4 wherein the dilute alkaline solution consists of a 1% sodium hydroxide solution.

6. The process as in claim 4 wherein the alkaline solution consists of a 1% sodium hydroxide solution and the heating takes place at a pressure of from 30–70 lbs. per square inch.

In witness whereof, I have hereunto subscribed my name.

ELTON R. DARLING.

CERTIFICATE OF CORRECTION.

Patent No. 1,828,028.　　　　　　　　　Granted October 20, 1931, to

ELTON R. DARLING.

It is hereby certified that error appears in the printed specification of the above numbered patent requiring correction as follows: Page 1, line 69, for the word "shedding" read shredding; page 2, lines 23 and 24, for the compound word "Schultz-O'Neil" read Schutz-O'Neil, and line 110, after the word "such" insert the word as; and that the said Letters Patent should be read with these corrections therein that the same may conform to the record of the case in the Patent Office.

Signed and sealed this 8th day of December, A. D. 1931.

(Seal)

M. J. Moore,
Acting Commissioner of Patents.